United States Patent

[11] 3,581,951

| [72] | Inventors | Fritz Sutter;<br>Wilhelm G. Weber, both of Pratteln,<br>Switzerland |
|---|---|---|
| [21] | Appl. No. | 791.432 |
| [22] | Filed | Jan. 15, 1969 |
| [45] | Patented | June 1, 1971 |
| [73] | Assignee | Buss AG<br>Basel, Switzerland |
| [32] | Priority | Feb. 26, 1968 |
| [33] | | Switzerland |
| [31] | | 3018/68 |

[54] APPARATUS FOR THE DEGASSING OF FINE-GRANULAR SUBSTANCES
2 Claims, 1 Drawing Fig.

[52] U.S. Cl. ............................ 222/190
[51] Int. Cl. ............................. B67d 5/58
[50] Field of Search ................... 222/190, 227, 368, 236, 226; 75/1, 2

[56] References Cited
UNITED STATES PATENTS
2,599,978 6/1952 Davis et al. .............. 222/368X Primary Examiner—Stanley H. Tollberg
Attorney—Abraham A. Saffitz ABSTRACT: The present invention relates to an apparatus for the degassing of fine-granular substances, which apparatus incorporates a vertically mounted cylindrical degassing chamber with tapering conical ends to the upper end of which a material infeed and dosage element with filler hopper and subjoined gravity tube intermediate piece is connected and to the lower end of which a pressure-sealed cell-type lock is connected, the degassing chamber being connected to a vacuum pump with a condensation separator.

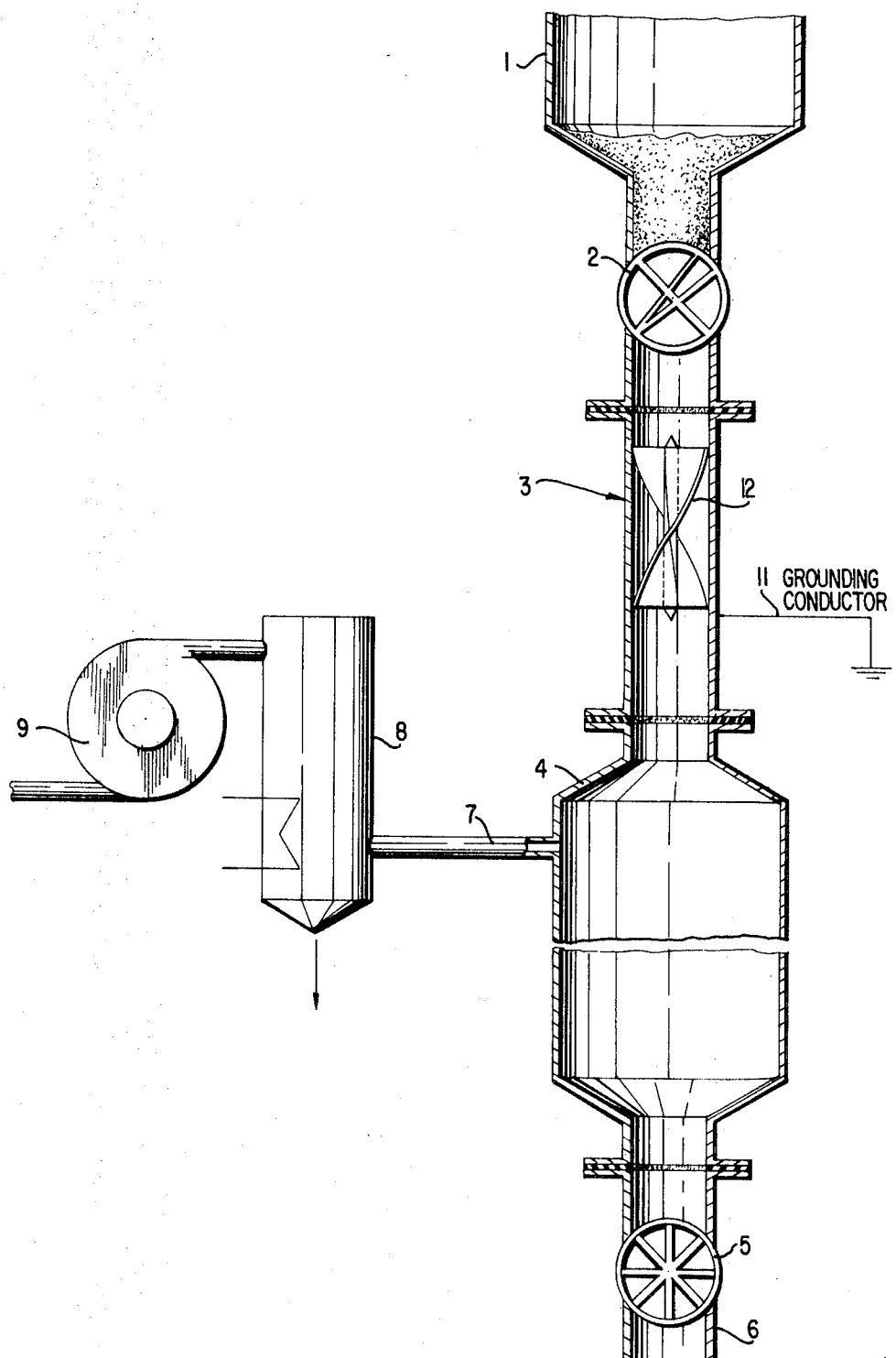

APPARATUS FOR THE DEGASSING OF FINE-GRANULAR SUBSTANCES

In process engineering it frequently becomes necessary to degas powder which is dry or which contains only a small quantity of moisture. This stage of processing, in which air or other gaseous inclusions are removed from the substance, is necessary either to achieve a more compact pour or to obviate undesirable reactions between the gas and the solid substance, in which case the degassed material may subsequently be enclosed in a protective gas.

A large number of different devices exist for carrying out of this task, most of them being highly technical. Those existing degassing installations which are simple in construction are unsatisfactory under protracted operation and at high throughputs, and modifying the structure to overcome these disadvantages is a wasteful expenditure of technical resources. Again, with existing installations the degassing time which is required for the material in the degassing zone is protracted, which results in a considerable slowing down of operating speeds and a additional load on the material.

The chief problems that continually arise in connection with the degassing of fine-granular substances are the following:

Sealing off the infeed and outlet elements,

The lodging of particles of material in the sealing elements and their consequent wear, Depositing of material in the degassing zone and the formation of dust clouds during degassing, Gap bridging and cleaning when changing materials.

The object of the present invention is to eliminate the aforementioned disadvantages and to propose a device for the degassing of fine-granular substances which solves these problems.

The device is characterized by the fact that it incorporates a vertically mounted cylindrical degassing chamber with tapering conical ends, to the upper end of which a material infeed and dosage element with filler hopper and subjoined gravity tube intermediate piece, and to the lower end of which a pressure-sealed cell-type lock valve, are connected, the degassing chamber being connected to a vacuum pump with condensation separator.

Preferably a means for loosening the granular material which flows into the inlet by gravity may be provided in the intermediate tubular portion to loosen up the material as it passes through and to generate a spiral movement. If the material to be degassed displays a tendency to take on an electrostatic charge, it will be an advantage to provide additionally in the gravity tube intermediate portion a grounding conductor for draining off the static, this conductor being connected at one end to the intermediate tubular portion and at the other end to ground to discharge the static.

The enclosed drawing illustrated diagrammatically one example of execution of the proposed apparatus.

The device incorporates a degassing chamber 4 which is mounted vertically. Basically it is cylindrical in shape but its upper and lower extremities are tapered conically. To the lower end is connected a pressure-sealed cell-type lock device 5 such for example as is described in Swiss Pat. No. 437, held by the applicant company.

This ensures an absolute pressure-proof closure and is not subject to problems associated with the lodging of material particles or wear. The outlet 6 of the cell-type lock 5 may be connected to additional devices not the subject of the present patent.

To the upper extremity of the degassing chamber 4 is connected, by means of flange connections 13a and 13b, an intermediate tubular portion 3. The length of this depends on the type of material to be processed, and for this reason it is preferable to arrange for it to be of an easily exchangeable type. Adjoining it and above is a material infeed and dosage element 2 which is provided with a filler hopper 1. Within the material infeed and dosage element 2 the unimpeded fall of the material fed into the hopper 1 is broken momentarily, the material being fed onwards in volumetrically regular doses. It is not material to the purpose of the invention whether a dosage worm gear, a cell-type lock or a powder pump be used in 2; of importance is solely the fact that the infeed and dosage element 2 is well filled with material so as to arrive at additional compacting by agency of the material itself. In many cases it will indeed be preferable to allow the material to collect in the hopper 1 up to a certain depth so as to improve compacting even further.

A grounding conductor 11 is connected at one to the intermediate tubular portion and at the other end to ground to drain accumulated static generated by the granular material passing through this portion, the particles passing by gravity along the loosening means 12 which provides a helical path.

To the degassing chamber 4 is connected a pipe 7 leading to a condensation separator 8 which is itself connected to a vacuum pump 9. The capacity of the condensation separator 9 must be designed sufficiently large to ensure a constant, disturbance-free vacuum not affected by pulsations in the degassing chamber 4.

The diameter of the degassing chamber 4 is many times greater than that of the gravity tube 3 so as to avoid material touching the walls of the degassing chamber as it falls.

In the gravity tube 3 there may be fitted a device illustrated schematically and identified as means 14 which imparts a helical path and serves to loosen up the flowing material and provide it with a spiralling movement, a similar device to that described in Swiss Pat. No. 438,389 held by the applicant company. As mentioned above, it is preferable, especially for material which displays a tendency to take on an electrostatic charge, to provide in the gravity tube 3 a grounding conductor 11 for draining the charge from the material.

With the device described in the foregoing, the problems hitherto arising in existing devices for the degassing of fine-granular materials are solved with a modest expenditure of technical resources. The high operating speed resulting from the continuously proceeding degassing process and the high throughput should be mentioned in particular.

What we claim is:

1. A pressure-proof device for the degassing of finely divided granular material comprising:
   a. a vertically mounted cylindrical degassing chamber having conically tapered ends, the upper end serving as the inlet for gravity flow of finely divided material through the chamber and the lower end serving as the outlet;
   b. a feeding means comprising a filling hopper and a dosing wheel under said hopper for delivering predetermined quantities of granular material to the inlet end of the degassing chamber;
   c. an intermediate tubular portion between the feeding means an upper inlet conical end of said degassing chamber;
   d. loosening means in said intermediate tubular portion which provides a helical path for granular material passing through said tubular portion from the feeding means;
   e. a vacuum pump operatively connected to said chamber between its conical ends to evacuate and thereby degas granular material flowing through said chamber;
   f. a condensation separator interposed between said vacuum pump and said chamber to remove condensable gases which are evacuated by said pump; and,
   g. a pressure-sealed cell-type black at the outlet end of said chamber for discharging the degassed, finely divided material.

2. A device as claimed in claim 1, which further includes a grounding conductor connected to one end to said intermediate tubular portion to drain static electricity therefrom and pass it to ground.